US012802614B2

(12) United States Patent
Chen et al.

(10) Patent No.: US 12,802,614 B2
(45) Date of Patent: Nov. 17, 2026

(54) POWER-DRIVING CIRCUIT FOR DISPLAY PANEL

(71) Applicant: GENETOUCH CORP., Taoyuan City (TW)

(72) Inventors: Cheng-Yu Chen, Taoyuan City (TW); Chi Lee, Taoyuan City (TW)

(73) Assignee: GENETOUCH CORP., Taoyuan City (TW)

( * ) Notice: Subject to any disclaimer, the term of this patent is extended or adjusted under 35 U.S.C. 154(b) by 0 days.

(21) Appl. No.: 19/310,871

(22) Filed: Aug. 26, 2025

(65) Prior Publication Data

US 2026/0065836 A1 Mar. 5, 2026

(30) Foreign Application Priority Data

Sep. 3, 2024 (TW) ................................ 113133317

(51) Int. Cl.
*G09G 3/20* (2006.01)

(52) U.S. Cl.
CPC ..... *G09G 3/2092* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 2006/0132398 | A1 | 6/2006 | Kim et al. |
| 2022/0415231 | A1 | 12/2022 | Lee et al. |
| 2024/0127757 | A1 | 4/2024 | Lee et al. |
| 2024/0194115 | A1 | 6/2024 | Min et al. |

FOREIGN PATENT DOCUMENTS

| | | | |
|---|---|---|---|
| CN | 114283721 | A | 4/2022 |
| CN | 217767800 | U | 11/2022 |

*Primary Examiner* — Aneeta Yodichkas

(74) *Attorney, Agent, or Firm* — Withrow + Terranova, PLLC; Vincent K. Gustafson

(57) ABSTRACT

A power-driving circuit for a display panel includes a timing controller IC unit, a first power management IC (PMIC) unit, a second PMIC unit, and a circuit unit. The first PMIC unit and the second PMIC unit are electrically connected to the timing controller IC unit to receive timing control signals. The circuit unit is electrically connected to the first PMIC unit and the second PMIC unit, and the first output ports of the first PMIC unit and the second output ports of the second PMIC unit are electrically connected in parallel to the output ports of the circuit unit. This results in increased current flow in the power-driving circuit, thereby providing sufficient drive to the back-end display unit. Therefore, this invention avoids the cost of over-design and is applicable in various display unit products with a single-specification PMIC unit.

2 Claims, 9 Drawing Sheets

POWER-DRIVING CIRCUIT FOR DISPLAY PANEL

CROSS-REFERENCE TO RELATED APPLICATION(S)

This application claims the priority benefit of Taiwan Patent Application No. 113133317 filed on Sep. 3, 2024, wherein the entire contents of the foregoing application are hereby incorporated by reference herein.

BACKGROUND OF THE INVENTION

1. Field of the Invention

The present invention relates to a power-driving circuit, and in particular to a power-driving circuit for a display panel.

2. Description of the Related Art

A power-driving circuit is a power management integrated circuit (PMIC) that manages power and current flow to meet the needs within various back-end electronic devices. PMICs offer functionalities such as power conversion, power management, and current control with built-in protections within the overall framework. The power conversion function is used to convert an input voltage into a stable voltage that meets the needs within the various back-end electronic devices. The power management function is used to dynamically adjust the power based on the device operation to save power. The current control function with built-in protections is used for precise current regulation to ensure system safety, including integrated current protection, thermal control and short-circuit protection.

With reference to FIG. 9, FIG. 9 is a block diagram of the conventional power-driving circuit for a display panel. The conventional power-driving circuit for the display panel mainly includes a timing controller integrated circuit (IC) unit 50, a power management IC unit 60, and a display unit 70. The timing controller IC unit 50 is a timing controller integrated circuit (TCON IC). The power management IC unit 60 is the PMIC. The display unit 70 includes a display driver IC 71 and a display panel 72. The timing controller IC unit 50 is electrically connected to the power management IC unit 60, to output a timing control signal to the power management IC unit 60. The power management IC unit 60 is electrically connected to the display driver IC 71, where the power management IC unit 60 outputs a power management signal to the display driver IC 71. The display driver IC 71 is electrically connected to the display panel 72, where the display driver IC 71 outputs a driving signal to the display panel 72 to display a screen on the display panel 72 according to the driving signal.

In general, the power management IC unit 60 is used to provide the stable voltage for the back-end display unit 70. When applied to various display units 70 of different products or sizes, the voltage or the current of the power management signal that the power management IC unit 60 outputs will be affected by the differences in capacitances and impedances of the display unit 70. For example, when the power management IC unit 60 is applied to the display unit 70 with high capacitance or high impedance, the internal complexity of the power management IC unit 60 is thus increased. Therefore, when developing products for different applications of the display unit 70, dedicated power management IC units 60 need to be designed to meet specific requirements. This leads to over-design of the power management IC unit 60, consequently increasing the overall cost.

SUMMARY OF THE INVENTION

A dedicated power management integrated circuit (PMIC) needs to be designed to meet specific requirements when developing products for different applications of display units, which consequently increases the overall cost. In view of the drawback, the present invention provides a power-driving circuit for a display panel, which is applicable in various display unit products with a single-specification PMIC unit.

In one embodiment of the present invention, which includes a timing controller integrated circuit (TCON IC) unit, a first PMIC unit, a second PMIC unit, and a circuit unit. The first PMIC unit includes a first input port and multiple first output ports, where the first input port is electrically connected to the TCON IC unit to receive a timing control signal. The second PMIC unit includes a second input port and multiple second output ports, where the second PMIC unit is also electrically connected to the TCON IC unit to receive the timing control signal. The circuit unit includes multiple first circuit unit input ports, multiple second circuit unit input ports, and multiple circuit unit output ports, where the first circuit unit input ports are electrically connected to the first output ports, and the second circuit unit input ports are electrically connected to the second output ports, to receive multiple power management signals from the first PMIC unit and the second PMIC unit.

Moreover, the first circuit unit input ports and the second circuit unit input ports are electrically connected to the circuit unit output ports, by electrically connecting in parallel the first output ports of the first PMIC unit and the second output ports of the second PMIC unit.

Furthermore, the circuit unit output ports are electrically connected to a display unit and output a parallel driving signal to the display unit.

In another embodiment of the present invention, which includes a TCON IC unit, a first PMIC unit, and a circuit unit. The first PMIC unit includes a first input port and multiple first output ports, where the first input port is electrically connected to the TCON IC unit to receive a timing control signal. The circuit unit includes multiple first circuit unit input ports and multiple circuit unit output ports, where the first circuit unit input ports are electrically connected to the first output port, to receive a power management signal from the first PMIC unit.

Moreover, the first output ports of the first PMIC unit include a first output terminal, a second output terminal, a third output terminal, and a fourth output terminal, and the circuit unit output ports of the circuit unit include a first circuit unit output terminal and a second circuit unit output terminal.

Furthermore, the first circuit unit input ports are electrically connected to the first circuit unit output terminal, by electrically connecting in parallel the first output terminal and the second output terminal; the first circuit unit input ports are electrically connected to the second circuit unit output terminal, by electrically connecting in parallel the third output terminal and the fourth output terminal; and the circuit unit output ports are electrically connected to the display unit and output a parallel driving signal to the display unit.

While the back-end display unit is experiencing excessive load, causing the first PMIC unit and the second PMIC unit to fail to provide sufficient current, the connection in the circuit unit can be adjusted in parallel with the first circuit unit input ports and the second circuit unit input ports, where the circuit unit is able to connect the first output ports of the first PMIC unit and the second output ports of the second PMIC unit in parallel, in order to increase the current flow, and deliver enough power to the back-end display panel.

Therefore, by utilizing a single-specification PMIC unit which is applicable in various display unit products, dedicated PMIC units are not required to be designed when driving display units with excessive load, thereby preventing over-design and the costs incurred therefrom.

DETAILED DESCRIPTION OF THE INVENTION

Figure 1:
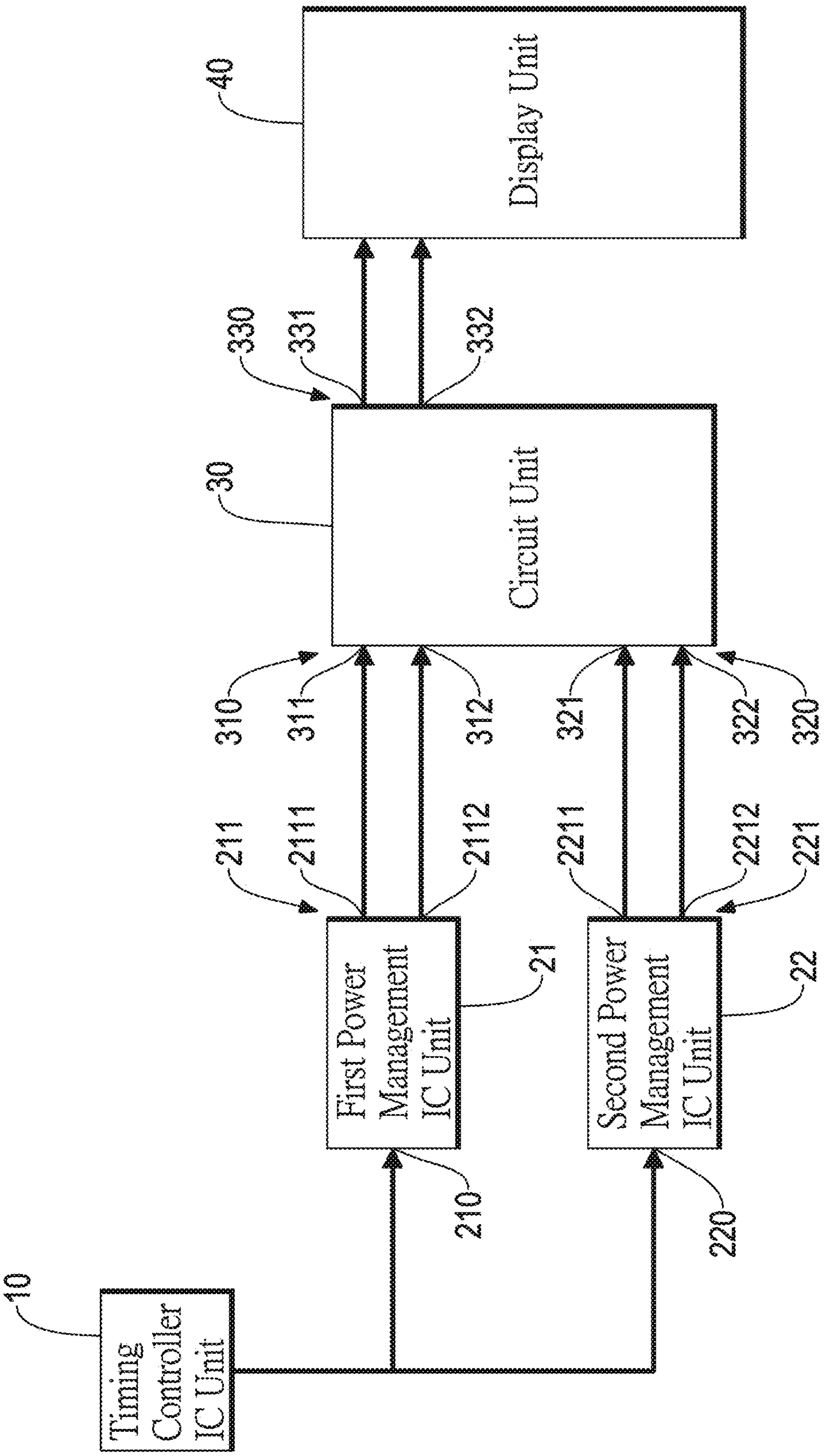
FIG. 1 is a block diagram of a power-driving circuit for a display panel of the present invention.

With reference to FIG. 1, FIG. 1 is a block diagram of a power-driving circuit for a display panel of the present invention. The power-driving circuit for the display panel of the present invention includes a timing controller integrated circuit (TCON IC) unit 10, a first power management integrated circuit (PMIC) unit 21, a second PMIC unit 22, and a circuit unit 30.

The first PMIC unit 21 includes a first input port 210 and multiple first output ports 211. The first input port 210 is electrically connected to the TCON IC unit 10, to receive a timing control signal. The second PMIC unit 22 includes a second input port 220 and multiple second output ports 221. The second input port 220 is electrically connected to the TCON IC unit 10, to receive the timing control signal. The circuit unit 30 includes multiple first circuit unit input ports 310, multiple second circuit unit input ports 320, and multiple circuit unit output ports 330.

The first circuit unit input ports 310 are electrically connected to the first output ports 211, and the second circuit unit input ports 320 are electrically connected to the second output ports 221, respectively, to receive multiple power management signals from the first PMIC unit 21 and the second PMIC unit 22.

The first circuit unit input ports 310 and the second circuit unit input ports 320 are electrically connected to the circuit unit output ports 330, by electrically connecting in parallel the first output ports 211 of the first PMIC unit 21 and the second output ports 221 of the second PMIC unit 22. Thereafter, the circuit unit output ports 330 are electrically connected to the display unit 40 and output a parallel driving signal to the display unit 40.

The first output ports 211 connected to the first circuit unit input ports 310 and the second output ports 221 connected to the second circuit unit input ports 320 can be connected in parallel in the circuit unit 30, such that the circuit unit 30 can output the driving signal through the circuit unit output ports 330. Therefore, while the back-end display unit 40 is a large-sized panel with a higher load, causing the first PMIC unit 21 and the second PMIC unit 22 to fail to provide sufficient current, connections in the circuit unit 30 can be adjusted in parallel with the first circuit unit input ports 310 and the second circuit unit input ports 320, where the circuit unit 30 is able to parallel the first output ports 211 of the first PMIC unit 21 and the second output ports 221 of the second PMIC unit 22, in order to increase the current flow, and deliver enough power to the back-end display unit 40.

As a result, by utilizing a single-specification PMIC unit which is applicable in various display unit 40 products, dedicated PMIC units are not required to be designed when driving display units 40 with excessive load, thereby preventing over-design and the costs incurred therefrom.

Figure 2:
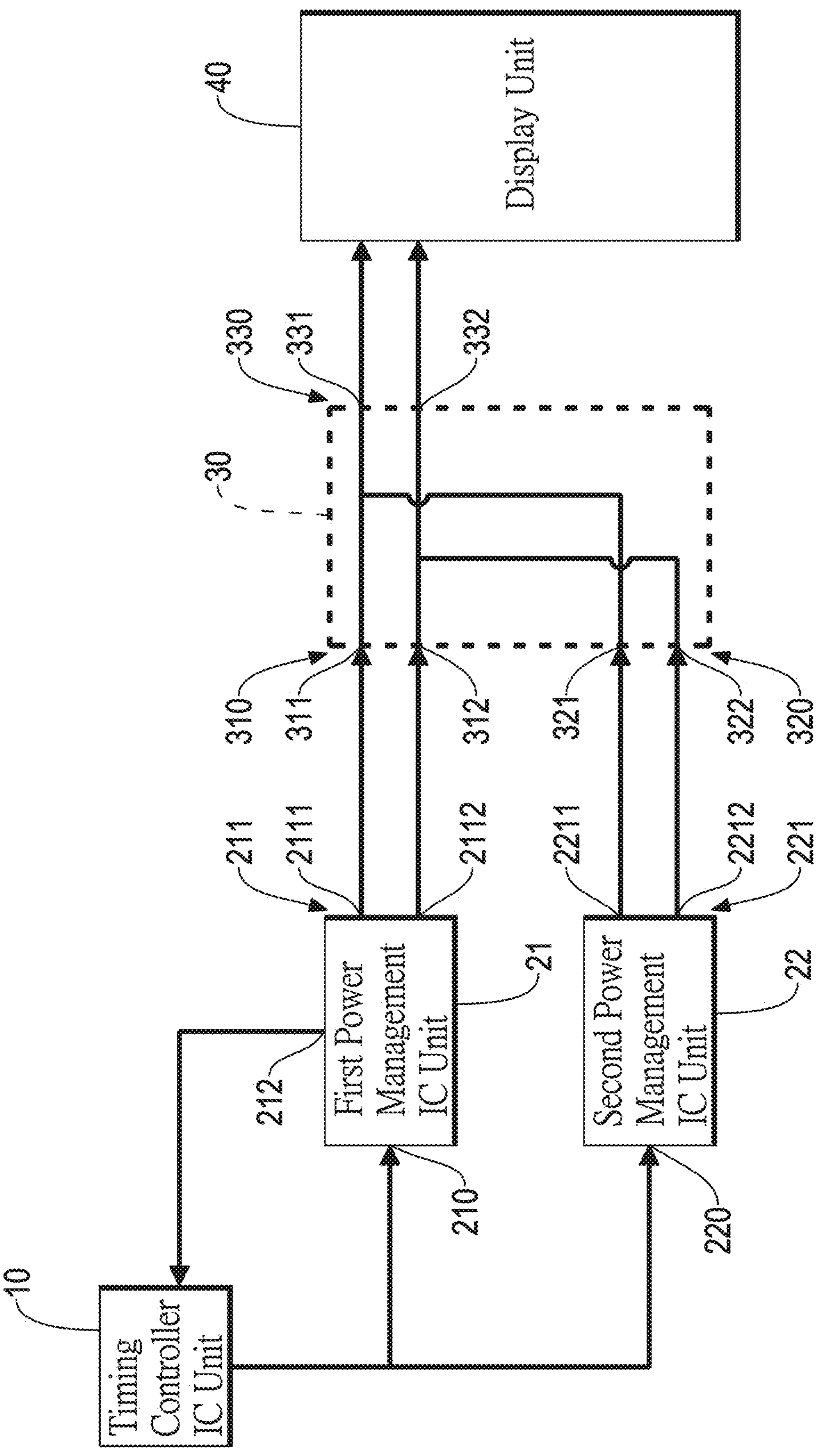
FIG. 2 is a block diagram of a first embodiment of the power-driving circuit for the display panel of the present invention.

With reference to FIG. 2, FIG. 2 is a block diagram of a first embodiment of the power-driving circuit for the display panel of the present invention. In the first embodiment, the first output ports 211 of the first PMIC unit 21 include a first master output terminal 2111 and a second master output terminal 2112. The second output ports 221 of the second PMIC unit 22 include a first slave output terminal 2211 and a second slave output terminal 2212. The first circuit unit input ports 310 of the circuit unit 30 include a first circuit unit master input terminal 311 and a second circuit unit master input terminal 312. The second circuit unit input ports 320 of the circuit unit 30 include a first circuit unit slave input terminal 321 and a second circuit unit slave input terminal 322. Moreover, the circuit unit output ports 330 of the circuit unit 30 include a first circuit unit output terminal 331 and a second circuit unit output terminal 332.

The first master output terminal 2111 of the first output ports 211 of the first PMIC unit 21 is electrically connected to the first circuit unit master input terminal 311 of the circuit unit 30, and the second master output terminal 2112 of the first output ports 211 of the first PMIC unit 21 is electrically connected to the second circuit unit master input terminal 312 of the circuit unit 30. The first slave output terminal 2211 of the second output ports 221 of the second PMIC unit 22 is electrically connected to the first circuit unit slave input terminal 321 of the circuit unit 30, and the second slave output terminal 2212 of the second output ports 221 of the second PMIC unit 22 is electrically connected to the second circuit unit slave input terminal 322 of the circuit unit 30.

The first master input terminal 2111 and the first slave input terminal 2211 are electrically connected in parallel to the first circuit unit output terminal 331, and the second master input terminal 2112 and the second slave input terminal 2212 are electrically connected in parallel to the second circuit unit output terminal 332.

In the embodiment, the circuit unit 30 is of a directly parallel output type. The first PMIC unit 21 functions as a master PMIC unit, and the second PMIC unit 22 functions as a slave PMIC unit. With three or more PMIC units included in the driving circuit, one of the PMIC units is chosen and functions as the master PMIC unit, and the other PMIC units are functioned as the slave PMIC unit.

Within the embodiment of directly parallel output type, a device address is given to the master PMIC unit, such as the first PMIC unit 21, and only the master PMIC unit is capable of receiving instructions for the device address and sending an acknowledgement (ACK), such as a first ACK, after executing the instructions. The other PMIC units are silent devices, such as the second PMIC unit 22, that can accept writes only and cannot allow reads. Because of the non-readable feature of the slave PMIC unit, a protection of the slave PMIC unit works in a linked method. For example, as one of the PMIC units triggers the protection, the other PMIC units will be shut down in order.

By connecting the master PMIC unit and the slave PMIC unit in parallel to the back-end display unit 40, the total available current increases, which allows for the delivery of sufficient power to the back-end display unit 40.

Moreover, in the embodiment, the first PMIC unit 21 further includes a first interrupt signal output terminal 212 that is electrically connected to the TCON IC unit 10, to output a first interrupt signal to the TCON IC unit 10. For example, the first interrupt signal output terminal 212 is an INTB output terminal that outputs an INTB signal.

Figure 3:
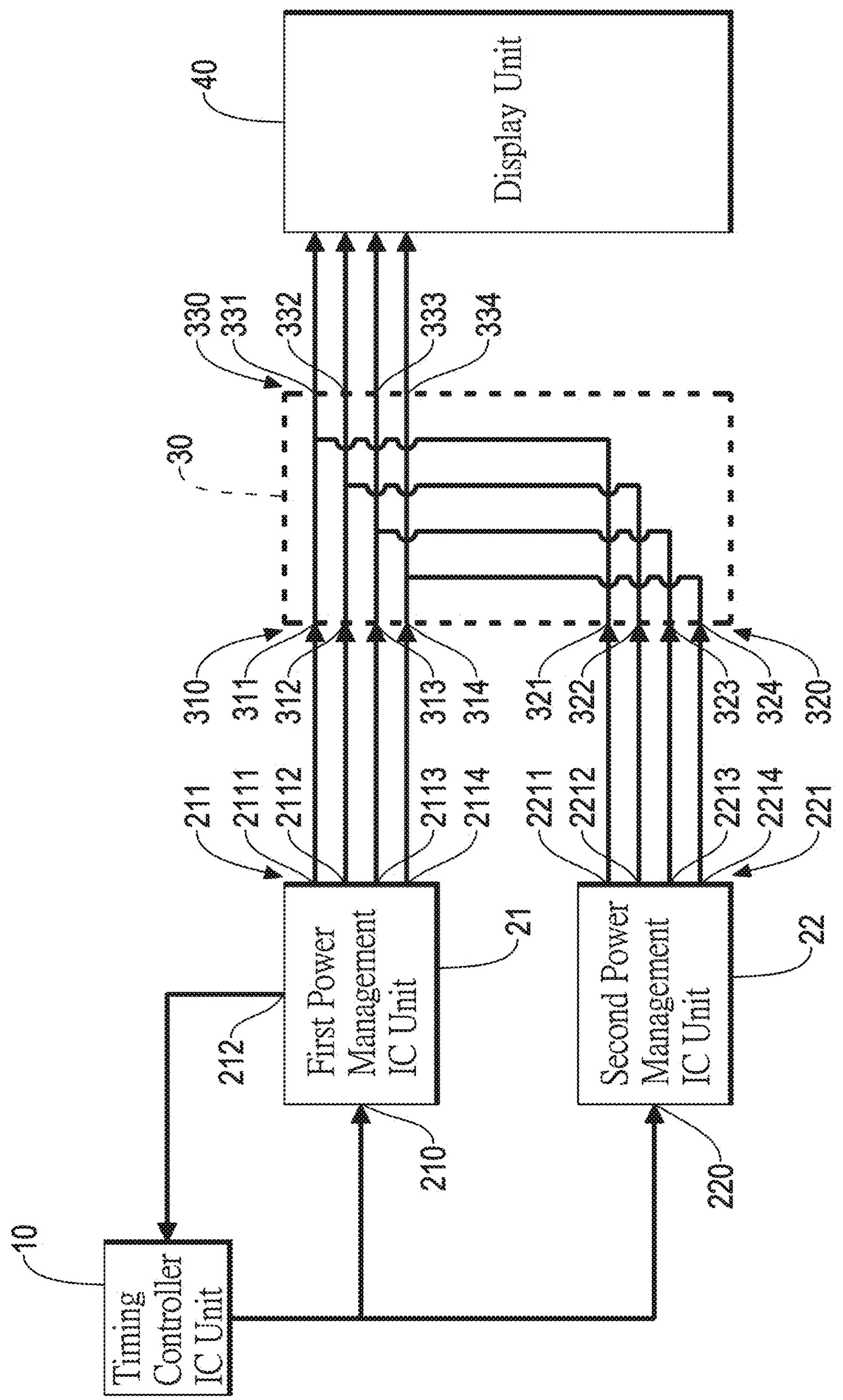
FIG. 3 is a block diagram of a second embodiment of the power-driving circuit for the display panel of the present invention.

With reference to FIG. 3, FIG. 3 is a block diagram of a second embodiment of the power-driving circuit for the display panel of the present invention. In the second embodiment, the first output ports 211 of the first PMIC unit 21 include a first master output terminal 2111, a second master output terminal 2112, a third master output terminal 2113, and a fourth master output terminal 2114. The second output ports 221 of the second PMIC unit 22 include a first slave output terminal 2211, a second slave output terminal 2212, a third slave output terminal 2213, and a fourth slave output terminal 2214. The first circuit unit input ports 310 of the circuit unit 30 include a first circuit unit master input terminal 311, a second circuit unit master input terminal 312, a third circuit unit master input terminal 313, and a fourth circuit unit master input terminal 314. The second circuit unit input ports 320 of the circuit unit 30 include a first circuit unit slave input terminal 321, a second circuit unit slave input terminal 322, a third circuit unit slave input terminal 323 and a fourth circuit unit slave input terminal 324. Moreover, the circuit unit output ports 330 of the circuit unit 30 include a first circuit unit output terminal 331, a second circuit unit output terminal 332, a third circuit unit output terminal 333, and a fourth circuit unit output terminal 334.

The first master output terminal 2111 of the first output ports 211 of the first PMIC unit 21 is electrically connected to the first circuit unit master input terminal 311 of the circuit unit 30. The second master output terminal 2112 of the first output ports 211 of the first PMIC unit 21 is electrically connected to the second circuit unit master input terminal 312 of the circuit unit 30. The third master output terminal 2113 of the first output ports 211 of the first PMIC unit 21 is electrically connected to the third circuit unit master input terminal 313 of the circuit unit 30. The fourth master output terminal 2114 of the first output ports 211 of the first PMIC unit 21 is electrically connected to the fourth circuit unit master input terminal 314 of the circuit unit 30.

The first slave output terminal 2211 of the second output ports 221 of the second PMIC unit 22 is electrically connected to the first circuit unit slave input terminal 321 of the second circuit unit input ports 320 of the circuit unit 30. The second slave output terminal 2212 of the second output ports 221 of the second PMIC unit 22 is electrically connected to the second circuit unit slave input terminal 322 of the second circuit unit input ports 320 of the circuit unit 30. The third slave output terminal 2213 of the second output ports 221 of the second PMIC unit 22 is electrically connected to the third circuit unit slave input terminal 323 of the second circuit unit input ports 320 of the circuit unit 30. The fourth slave output terminal 2214 of the second output ports 221 of the second PMIC unit 22 is electrically connected to the fourth circuit unit slave input terminal 324 of the second circuit unit input ports 320 of the circuit unit 30.

The first master input terminal 2111 and the first slave input terminal 2211 are electrically connected in parallel to the first circuit unit output terminal 331. The second master input terminal 2112 and the second slave input terminal 2212 are electrically connected in parallel to the second circuit unit output terminal 332. The third master input terminal 2113 and the third slave input terminal 2213 are electrically connected in parallel to the third circuit unit output terminal 333. The fourth master input terminal 2114 and the fourth slave input terminal 2214 are electrically connected in parallel to the fourth circuit unit output terminal 334.

Similar to the first embodiment, the circuit unit 30 of the embodiment is of a directly parallel output type. The first PMIC unit 21 functions as a master PMIC unit, and the second PMIC unit 22 functions as a slave PMIC unit.

Identically, within the embodiment of directly parallel output type, only the master PMIC unit, which is the first PMIC unit 21, is capable of receiving instructions, and sending the ACK after executing the instructions.

Likewise, in the embodiment, the first PMIC unit 21 further includes a first interrupt signal output terminal 212 that is electrically connected to the TCON IC unit 10, to output a first interrupt signal to the TCON IC unit 10.

Figure 4:
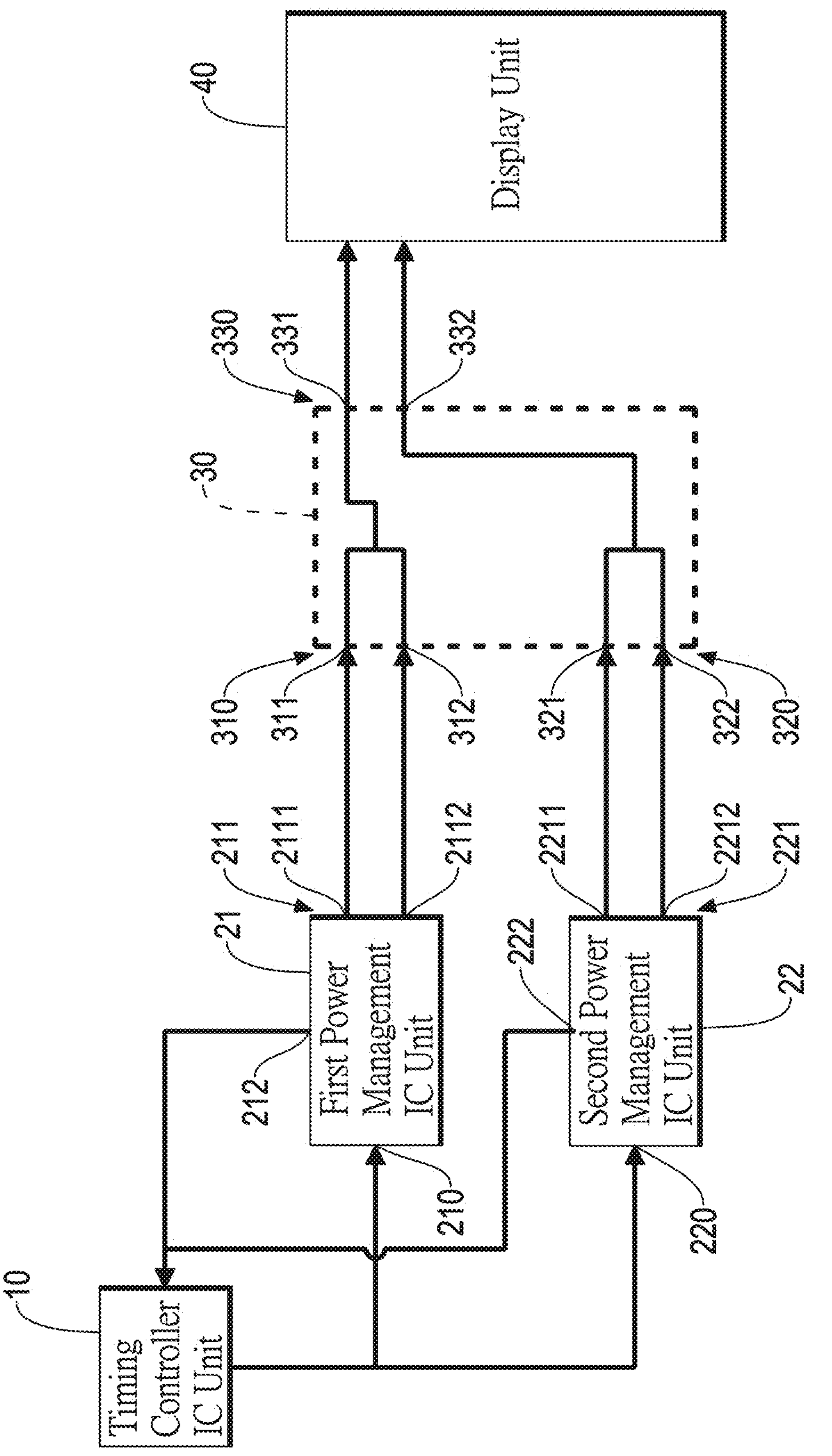
FIG. 4 is a block diagram of a third embodiment of the power-driving circuit for the display panel of the present invention.

With reference to FIG. 4, FIG. 4 is a block diagram of a third embodiment of the power-driving circuit for the display panel of the present invention. In the third embodiment, the first output ports 211 of the first PMIC unit 21 include a first output terminal 2111 and a second output terminal 2112. The second output ports 221 of the second PMIC unit 22 include a second output terminal 2211 and a second output terminal 2212.

The circuit unit output ports 330 of the circuit unit 30 include a first circuit unit output terminal 331 and a second circuit unit output terminal 332. The first circuit unit input ports 310 of the circuit unit 30 include a first circuit unit input terminal 311 and a second circuit unit input terminal 312, and the second circuit unit input ports 320 of the circuit unit 30 include a first circuit unit input terminal 321 and a second circuit unit input terminal 322.

The first output terminal 2111 of the first output ports 211 of the first PMIC unit 21 is electrically connected to the first circuit unit input terminal 311 of the first circuit unit input ports 310 of the circuit unit 30, and the second output terminal 2112 of the first output ports 211 of the first PMIC unit 21 is electrically connected to the second circuit unit input terminal 312 of the first circuit unit input ports 310 of the circuit unit 30. The first output terminal 2211 of the second output ports 221 of the second PMIC unit 22 is electrically connected to the first circuit unit input terminal 321 of the second circuit unit input ports 320 of the circuit unit 30, and the second output terminal 2212 of the second output ports 221 of the second PMIC unit 22 is electrically connected to the second circuit unit input terminal 322 of the second circuit unit input ports 320 of the circuit unit 30.

The first output terminal 2111 and the second output terminal 2112 of the first output ports 211 of the first PMIC unit 21 are electrically connected in parallel to the first circuit unit output terminal 331, and the first output terminal 2211 and the second output terminal 2212 of the second output ports 221 of the second PMIC unit 22 are electrically connected in parallel to the second circuit unit output terminal 332.

In the embodiment, the circuit unit 30 is of a merged channel type, and the circuit unit 30 is used for controlling the merged output channels. Where every PMIC unit has a unique address, and when an instruction matches the corresponding address, the corresponding device will execute the instructions and sending the ACK after executing the instructions. Because every PMIC unit has their unique address, the protection is also separated from other PMIC units. For example, the PMIC unit that triggers the protection will be shut down individually.

Since the circuit unit 30 can control the number of channel merges, as the merged output channels increase, the total available current also rises, which allows for the delivery of sufficient power to the back-end display unit 40.

Moreover, in the embodiment, the first PMIC unit 21 further includes a first interrupt signal output terminal 212 that is electrically connected to the TCON IC unit 10, to output a first interrupt signal to the TCON IC unit 10. The second PMIC unit 22 further includes a second interrupt signal output terminal 222 that is electrically connected to the TCON IC unit 10, to output a second interrupt signal to the TCON IC unit 10. For example, the first interrupt signal output terminal 212 and the second interrupt signal output terminal 222 are INTB output terminals that output INTB signals.

Figure 5:
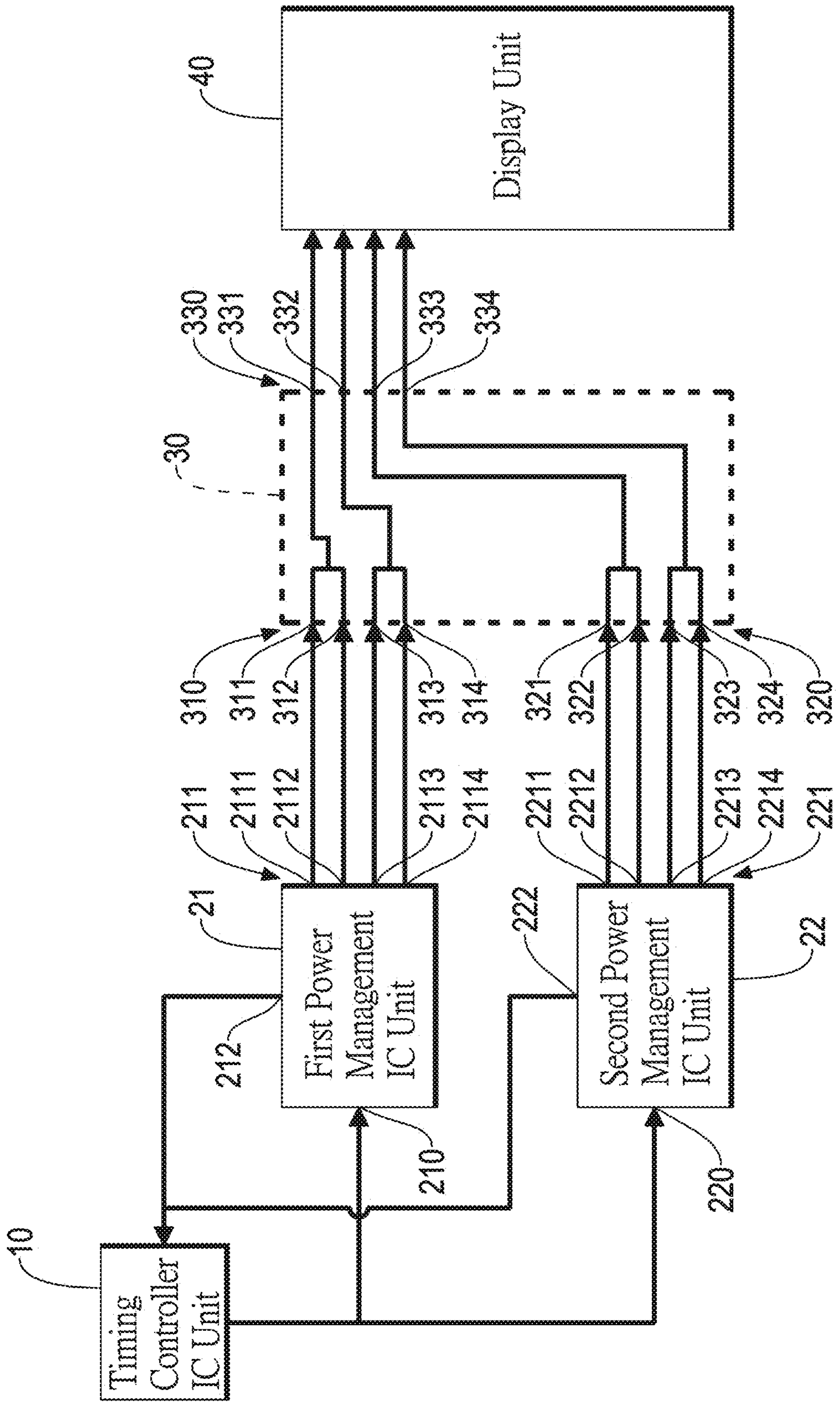
FIG. 5 is a block diagram of a fourth embodiment of the power-driving circuit for the display panel of the present invention.

With reference to FIG. 5, FIG. 5 is a block diagram of a fourth embodiment of the power-driving circuit for the display panel of the present invention. In the fourth embodiment, the first output ports 211 of the first PMIC unit 21 include a first output terminal 2111, a second output terminal 2112, a third output terminal 2113, and a fourth output terminal 2114. The second output ports 221 of the second PMIC unit 22 include a second output terminal 2211, a second output terminal 2212, a third output terminal 2213, and a fourth output terminal 2214.

The circuit unit output ports 330 of the circuit unit 30 include a first circuit unit output terminal 331, a second circuit unit output terminal 332, a third circuit unit output terminal 333, and a fourth circuit unit output terminal 334.

The first circuit unit input ports 310 of the circuit unit 30 include a first circuit unit input terminal 311, a second circuit unit input terminal 312, a third circuit unit input terminal 313, and a fourth circuit unit input terminal 314. The second circuit unit input ports 320 of the circuit unit 30 include a first circuit unit input terminal 321, a second circuit unit input terminal 322, a third circuit unit input terminal 323, and a fourth circuit unit input terminal 324.

The first output terminal 2111 of the first output ports 211 of the first PMIC unit 21 is electrically connected to the first circuit unit input terminal 311 of the first circuit unit input ports 310 of the circuit unit 30, the second output terminal 2112 of the first output ports 211 of the first PMIC unit 21 is electrically connected to the second circuit unit input terminal 312 of the first circuit unit input ports 310 of the circuit unit 30, the third output terminal 2113 of the first output ports 211 of the first PMIC unit 21 is electrically connected to the third circuit unit input terminal 313 of the first circuit unit input ports 310 of the circuit unit 30, and the fourth output terminal 2114 of the first output ports 211 of the first PMIC unit 21 is electrically connected to the fourth circuit unit input terminal 314 of the first circuit unit input ports 310 of the circuit unit 30.

The first output terminal 2211 of the second output ports 221 of the second PMIC unit 22 is electrically connected to the first circuit unit input terminal 321 of the second circuit unit input ports 320 of the circuit unit 30, the second output terminal 2212 of the second output ports 221 of the second PMIC unit 22 is electrically connected to the second circuit unit input terminal 322 of the second circuit unit input ports 320 of the circuit unit 30, the third output terminal 2213 of the second output ports 221 of the second PMIC unit 22 is electrically connected to the third circuit unit input terminal 323 of the second circuit unit input ports 320 of the circuit unit 30, and the fourth output terminal 2214 of the second output ports 221 of the second PMIC unit 22 is electrically connected to the fourth circuit unit input terminal 324 of the second circuit unit input ports 320 of the circuit unit 30.

The first output terminal 2111 and the second output terminal 2112 of the first output ports 211 of the first PMIC unit 21 are electrically connected in parallel to the first circuit unit output terminal 331, and the third output terminal 2113 and the fourth output terminal 2114 of the first output ports 211 of the first PMIC unit 21 are electrically connected in parallel to the second circuit unit output terminal 332. The first output terminal 2211 and the second output terminal 2212 of the second output ports 221 of the second PMIC unit 22 are electrically connected in parallel to the third circuit unit output terminal 333, and the third output terminal 2213 and the fourth output terminal 2214 of the second output ports 221 of the second PMIC unit 22 are electrically connected in parallel to the fourth circuit unit output terminal 334.

Identically, within the embodiment of merged channel type of the circuit unit 30, every PMIC unit, such as the first PMIC unit 21 and the second PMIC unit 22, will execute the instructions that are received respectively, and sending the ACK after executing the instructions.

Moreover, in the embodiment, the first PMIC unit 21 further includes a first interrupt signal output terminal 212 that is electrically connected to the TCON IC unit 10, to output a first interrupt signal to the TCON IC unit 10. The second PMIC unit 22 further includes a second interrupt signal output terminal 222 that is electrically connected to the TCON IC unit 10, to output a second interrupt signal to the TCON IC unit 10.

Figure 6:
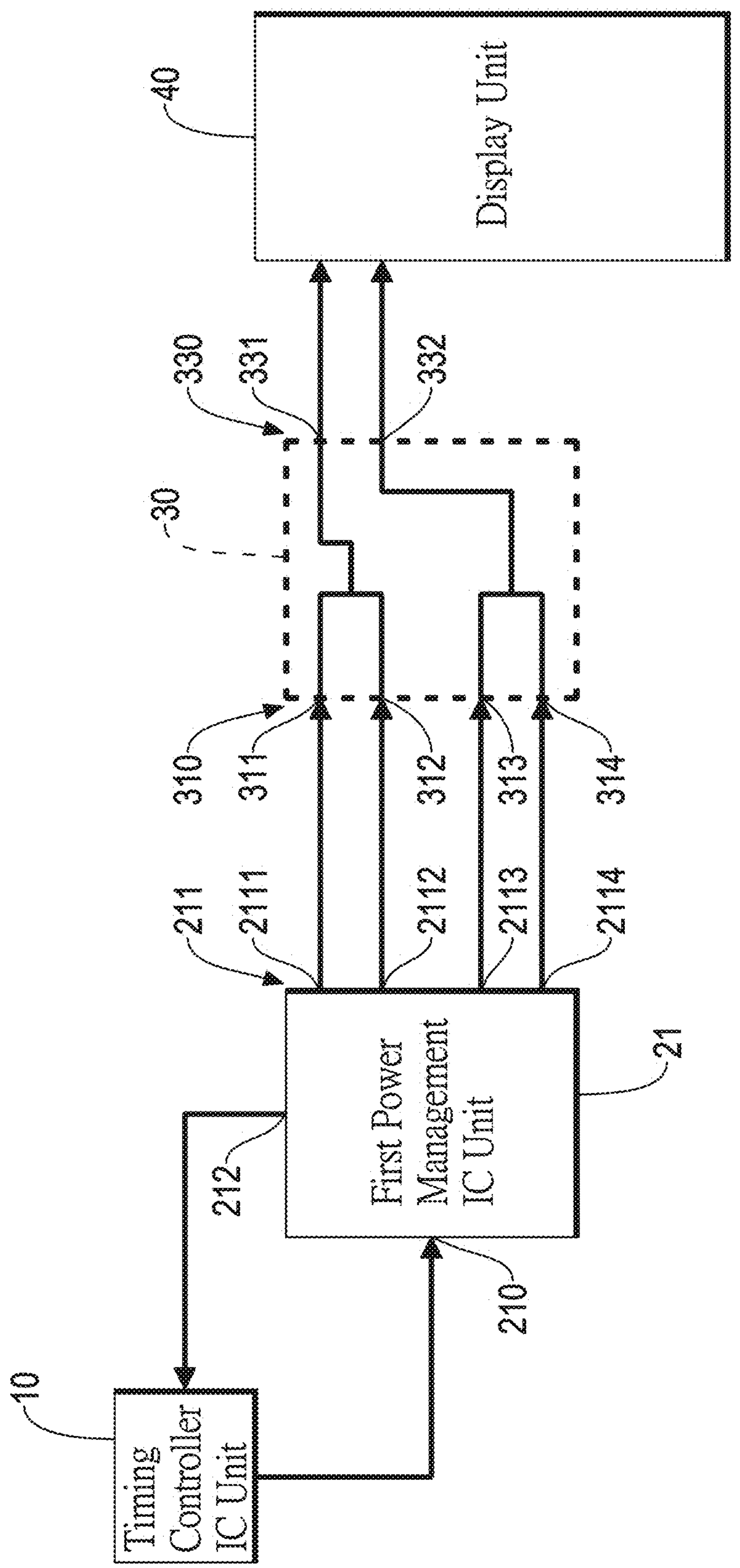
FIG. 6 is a block diagram of a fifth embodiment of the power-driving circuit for the display panel of the present invention.

With reference to FIG. 6, FIG. 6 is a block diagram of a fifth embodiment of the power-driving circuit for the display panel of the present invention. In the fifth embodiment, the present invention of the power-driving circuit for a display panel includes a TCON IC unit 10, a first PMIC unit 21, and a circuit unit 30.

The first PMIC unit 21 includes a first input port 210 and multiple first output ports 211. The first input port 210 is electrically connected to the TCON IC unit 10 to receive a timing control signal.

The circuit unit 30 includes multiple first circuit unit input ports 310 and multiple circuit unit output ports 330. The first circuit unit input ports 310 are electrically connected to the first output ports 211 to receive a power management signal from the first PMIC unit 21. The first output ports 211 of the first PMIC unit 21 includes a first output terminal 2111, a second output terminal 2112, a third output terminal 2113, and a fourth output terminal 2114. The circuit unit output ports 330 of the circuit unit 30 include a first circuit unit output terminal 331 and a second circuit unit output terminal 332.

The first circuit unit input ports 310 of the circuit unit 30 include a first circuit unit input terminal 311, a second circuit unit input terminal 312, a third circuit unit input terminal 313, and a fourth circuit unit input terminal 314.

The first output terminal 2111 of the first output ports 211 of the first PMIC unit 21 is electrically connected to the first circuit unit input terminal 311 of the first circuit unit input ports 310 of the circuit unit 30, the second output terminal 2112 of the first output ports 211 of the first PMIC unit 21 is electrically connected to the second circuit unit input terminal 312 of the first circuit unit input ports 310 of the circuit unit 30, the third output terminal 2113 of the first output ports 211 of the first PMIC unit 21 is electrically connected to the third circuit unit input terminal 313 of the first circuit unit input ports 310 of the circuit unit 30, and the fourth output terminal 2114 of the first output ports 211 of the first PMIC unit 21 is electrically connected to the fourth circuit unit input terminal 314 of the first circuit unit input ports 310 of the circuit unit 30.

The first output terminal 2111 and the second output terminal 2112 of the first output ports 211 of the first PMIC unit 21 are electrically connected in parallel to the first circuit unit output terminal 331, and the third output terminal 2113 and the fourth output terminal 2114 of the first output ports 211 of the first PMIC unit 21 are electrically connected in parallel to the second circuit unit output terminal 332. The circuit unit output ports 330 are electrically connected to and output a parallel driving signal to the display unit 40.

In the embodiment, the circuit unit 30 is of a merged channel type. Moreover, the first PMIC unit 21 further includes a first interrupt signal output terminal 212 that is electrically connected to the TCON IC unit 10, to output a first interrupt signal to the TCON IC unit 10. For example, the first interrupt signal output terminal 212 is an INTB output terminal that outputs an INTB signal.

In the first to the fifth embodiments, the first PMIC unit 21 or the second PMIC unit 21 uses an inter-integrated circuit ($I^2C$) architecture to connect with the front-end TCON IC unit 10 to receive the instructions from the TCON IC unit 10, but is not limited to $I^2C$ architecture for communication.

Figure 7:
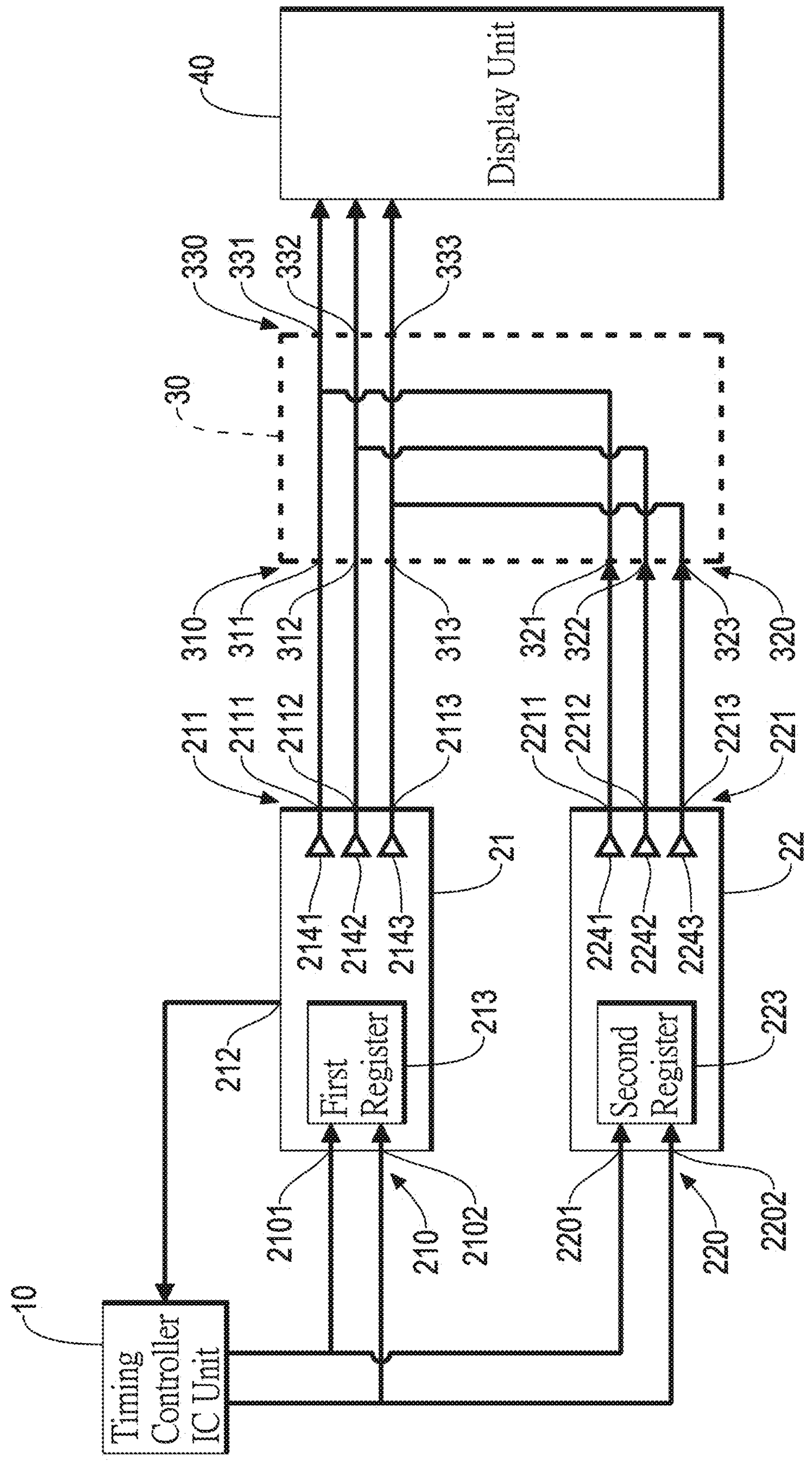
FIG. 7 is a block diagram of a sixth embodiment of the power-driving circuit for the display panel of the present invention.

With reference to FIG. 7, FIG. 7 is a block diagram of a sixth embodiment of the power-driving circuit for a display panel of the present invention. In the sixth embodiment, the first PMIC unit 21 includes a first register 213, and the first input port 210 of the first PMIC unit 21 includes a first input terminal 2101 and a second input terminal 2102. The TCON IC unit 10 is connected via two lines to the first input terminal 2101 and the second input terminal 2102. By using $I^2C$ architecture as an example, the first input terminal 2101 is a serial data line pin, and the second input terminal 2102 is a serial clock pin. Besides, the first PMIC unit 21 further includes a first buffer output terminal 2141, a second buffer output terminal 2142, and a third buffer output terminal 2143.

In the embodiment, the first output ports 211 of the first PMIC unit 21 include a first master output terminal 2111, a second master output terminal 2112, and a third master output terminal 2113. The first master output terminal 2111 is electrically connected to the first buffer output terminal 2141, the second master output terminal 2112 is electrically connected to the second buffer output terminal 2142, and the third master output terminal 2113 is electrically connected to the third buffer output terminal 2143. The second PMIC unit 22 includes a second register 223, and the second input port 220 of the second register 223 includes a first input terminal 2201 and a second input terminal 2202. The TCON IC unit 10 is connected via two lines to the first input terminal 2201 and the second input terminal 2202.

By using $I^2C$ architecture as an example, the first input terminal 2201 is a serial data line pin, and the second input terminal 2202 is a serial clock pin. Besides, the second PMIC unit 22 further includes a first buffer output terminal 2241, a second buffer output terminal 2242, and a third buffer output terminal 2243. In the embodiment, the second output ports 221 of the second PMIC unit 22 include a first slave output terminal 2211, a second slave output terminal 2212, and a third slave output terminal 2213. The first slave output terminal 2211 is electrically connected to the first buffer output terminal 2241, the second slave output terminal 2212 is electrically connected to the second buffer output terminal 2242, and the third slave output terminal 2213 is electrically connected to the third buffer output terminal 2243.

Moreover, in the embodiment, the circuit unit 30 is of a directly parallel output type. Taking $I^2C$ architecture as an example, the TCON IC unit 10 is used to control the merged output patterns of the first buffer output terminal 2141, the second buffer output terminal 2142, and the third buffer output terminal 2143 of the first PMIC unit 21, and the first buffer output terminal 2241, the second buffer output terminal 2242, and the third buffer output terminal 2243 of the second PMIC unit 22, through the first input terminal 2101 of the first register 213.

For example, the TCON IC unit 10 provides controls over the merging states of the first PMIC unit 21 and the second PMIC unit 22, allowing for an unmerged configuration, a two-channel merged configuration, or a three-channel merged configuration. If the two-channel merged configuration is chosen, the output of the first buffer output terminal 2241 of the second PMIC unit 22 is controlled by the first buffer output terminal 2141 of the first PMIC unit 21. For instance, the output of the first buffer output terminal 2141 of the first PMIC unit 21 is controlled to be 16 volts and 300 milliamps, and the output of the first buffer output terminal 2241 of the second PMIC unit 22 is also controlled to be 16 volts and 300 milliamps. Then, the first buffer output terminal 2141 of the first PMIC unit 21 and the first buffer output terminal 2241 of the second PMIC unit 22 are connected in parallel to the first circuit unit output terminal 331 via the circuit unit 30, with the first circuit unit output terminal 331 outputting 600 milliamps.

Figure 8:
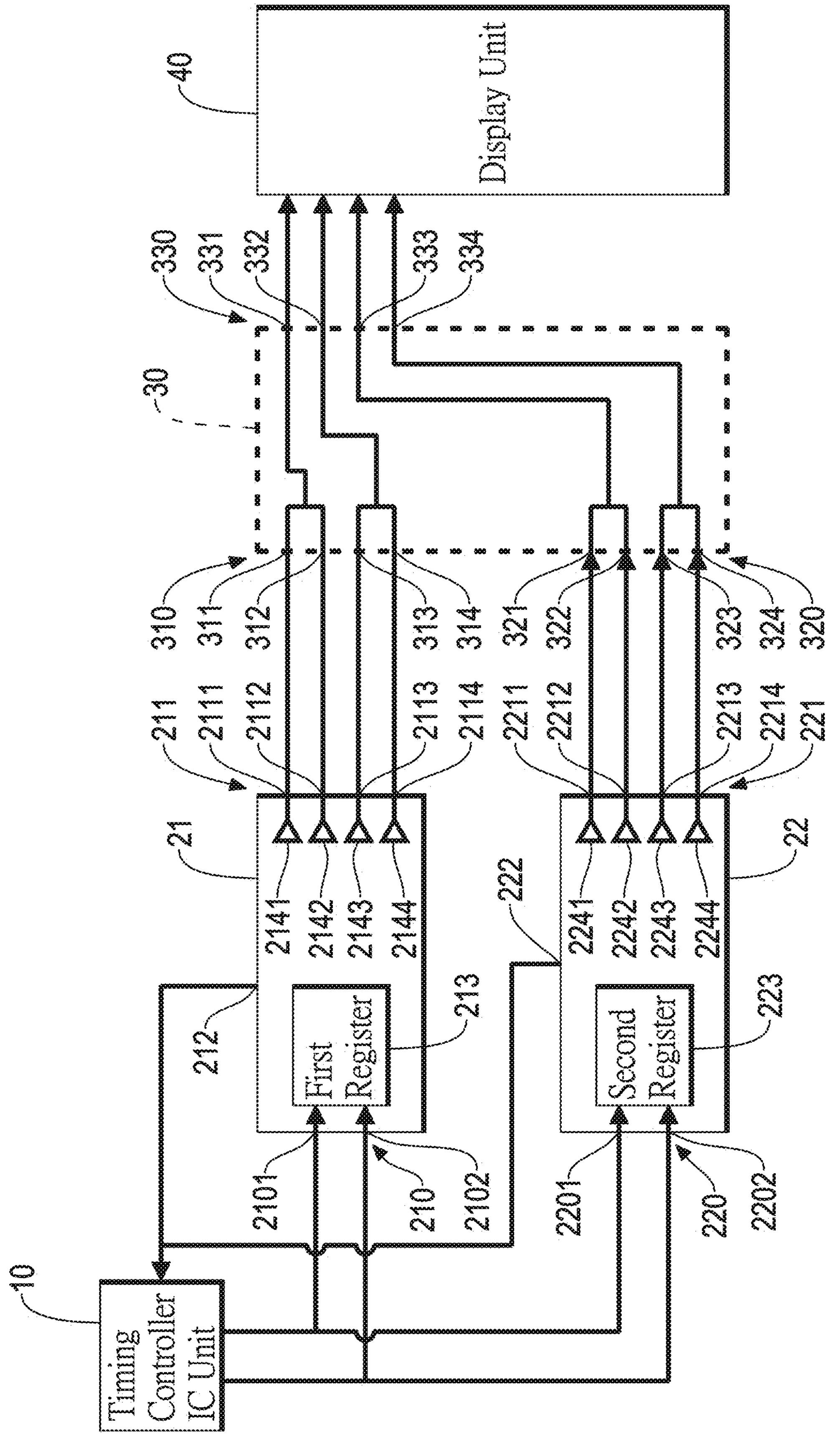
FIG. 8 is a block diagram of a seventh embodiment of the power-driving circuit for the display panel of the present invention.
Figure 9:
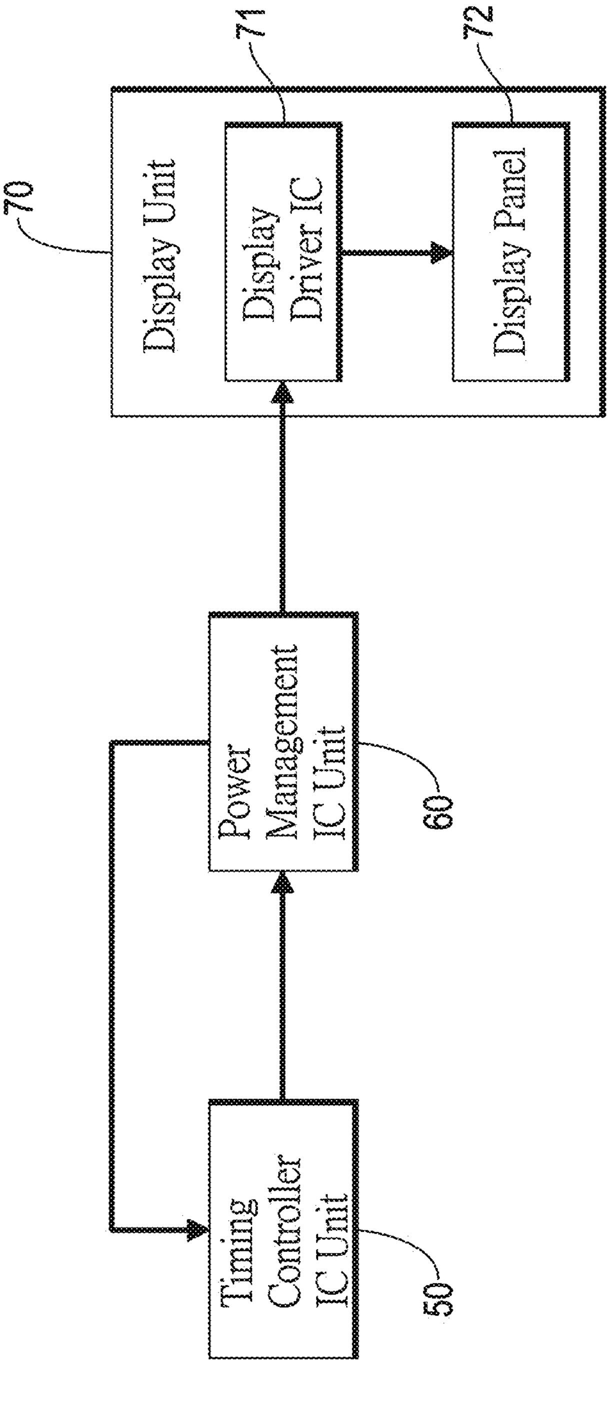
FIG.9 PRIOR ART
FIG. 9 is a block diagram of the conventional power-driving circuit for a display panel.

With reference to FIG. 8, FIG. 8 is a block diagram of a seventh embodiment of the power-driving circuit for a display panel of the present invention. In the seventh embodiment, the first PMIC unit 21 includes a first buffer 213, and the first input port 210 of the first PMIC unit 21 includes a first input terminal 2101 and a second input terminal 2102. The TCON IC unit 10 is connected via two lines to the first input terminal 2101 and the second input terminal 2102 of the first input port 210 of the first PMIC unit 21. By using $I^2C$ architecture as an example, the first input terminal 2101 is a serial data line pin, and the second input terminal 2102 is a serial clock pin. The first PMIC unit 21 further includes a first buffer output terminal 2141, a second buffer output terminal 2142, a third buffer output terminal 2143, and a fourth buffer output terminal 2144.

In the embodiment, the first output ports 211 of the first PMIC unit 21 include a first output terminal 2111, a second output terminal 2112, a third output terminal 2113, and a fourth output terminal 2114. The first output terminal 2111 is electrically connected to the first buffer output terminal 2141, the second output terminal 2112 is electrically connected to the second buffer output terminal 2142, the third output terminal 2113 is electrically connected to the third buffer output terminal 2143, and the fourth output terminal 2114 is electrically connected to the fourth buffer output terminal 2144.

Furthermore, the second PMIC unit 22 includes a second buffer 223, and the second input port 220 includes a first input terminal 2201 and a second input terminal 2202. The TCON IC unit 10 is connected via two lines to the first input terminal 2201 and the second input terminal 2202 of the second input port 220 of the second PMIC unit 22.

By using $I^2C$ architecture as an example, the first input terminal 2201 is a serial data line pin, and the second input terminal 2202 is a serial clock pin. The second PMIC unit 21 further includes a first buffer output terminal 2241, a second buffer output terminal 2242, a third buffer output terminal 2243, and a fourth buffer output terminal 2244. In the embodiment, the second output ports 221 of the second PMIC unit 22 include a first output terminal 2211, a second output terminal 2212, a third output terminal 2213, and a fourth output terminal 2214. The first output terminal 2211 is electrically connected to the first buffer output terminal 2241, the second output terminal 2212 is electrically connected to the second buffer output terminal 2242, the third output terminal 2213 is electrically connected to the third buffer output terminal 2243, and the fourth output terminal 2214 is electrically connected to the fourth buffer output terminal 2244.

Moreover, in the embodiment, the circuit unit 30 is of a merged channel type. Taking $I^2C$ architecture as an example, the TCON IC unit 10 is used to control the merged output patterns of the first buffer output terminal 2141, the second buffer output terminal 2142, the third buffer output terminal 2143, and the fourth buffer output terminal 2144 of the first PMIC unit 21, and the first buffer output terminal 2241, the second buffer output terminal 2242, the third buffer output terminal 2243, and the fourth buffer output terminal 2244 of the second PMIC unit 22, through the first input terminal 2101 of the first register 213.

For example, the TCON IC unit 10 provides controls over the merging states of the first PMIC unit 21 and the second PMIC unit 22, allowing for an unmerged configuration, a two-channel merged configuration, or a three-channel merged configuration. If the two-channel merged configuration is chosen, the output of the second buffer output terminal 2142 of the first PMIC unit 21 is controlled by the first buffer output terminal 2141 of the first PMIC unit 21. For instance, the output of the first buffer output terminal 2141 of the first PMIC unit 21 is controlled to be 16 volts and 300 milliamps, and the output of the second buffer output terminal 2142 of the first PMIC unit 21 is also controlled to be 16 volts and 300 milliamps. Then, the first buffer output terminal 2141 of the first PMIC unit 21 and the second buffer output terminal 2142 of the first PMIC unit 21 are connected in parallel to the first circuit unit output terminal 331 via the circuit unit 30, with the first circuit unit output terminal 331 outputting 600 milliamps.

For example, the first buffer 213 and the second buffer 223 are each a 2-bit register, and the truth table of the 2-bit register is shown in Table 1 as follows:

TABLE 1

| Register | Hardware pin | | Device | Device |
|---|---|---|---|---|
| XXh | A1 pin | A0 pin | Address | Status |
| 00h | 0 | 0 | 62h | Slave |
| | 0 | 1 | 63h | Master |
| | 1 | 0 | 64h | Master |
| | 1 | 1 | 65h | Master |
| 01h~03h | 0 | 0 | 62h | Master |
| | 0 | 1 | 63h | Master |
| | 1 | 0 | 64h | Master |
| | 1 | 1 | 65h | Master |

When the register is set to 00h, the directly parallel output type is activated.

When the hardware pins are set to 00, the device status is set as a slave PMIC unit, with a device address of 62h. The slave PMIC unit becomes a silent device that can accept writes only, and cannot allow responds.

When the hardware pins are set to 01, 10, or 11, the device status is set as a master PMIC unit, and with a device address of 63h, 64h, or 65h.

With the directly parallel output type activated, only the master PMIC unit is connected to the TCON IC unit with INTB, an interrupt signal. When INTB is set to a 1-bit binary number with a value of 1, the TCON IC unit accesses the PMIC unit via the bus to learn the status of the PMIC unit, to determine whether the protection is triggered, and the protection works of the PMIC units are linked.

When the register is set to 01h to 03h, the merged channel type is activated.

When the register is set to a 2-bit binary number with a value of 01, the unmerged configuration, which is the default configuration, is activated.

When the register is set to a 2-bit binary number with a value of 10, the two-channel merged configuration is activated.

When the register is set to a 2-bit binary number with a value of 11, the three-channel merged configuration is activated.

The device addresses 62h to 65h can all be used when the merged channel type is activated.

With the merged channel type is activated, the interrupt signal, INTB, is connected in parallel among all PMIC units to the TCON IC unit, where the TCON IC unit accesses the registers to learn the status with a round-robin scheme.

When the INTB is set to a 1-bit binary number with a value of 1, the TCON IC unit accesses the PMIC unit via the bus with the round-robin scheme to determine which PMIC unit triggered the protection, and the protection is separated from other PMIC units.

Furthermore, the interrupt signal is used for providing various protections, such as undervoltage-lockout (UVLO), over-temperature protection (OTP), overvoltage protection (OVP), and overcurrent protection (OCP), which function identically in the merged channel type or the directly parallel output type, to allow the TCON IC to perform further processing.

Moreover, in the first to the seventh embodiments, the TCON IC unit 10, the first PMIC unit 21, the second PMIC unit 22, and the circuit unit 30 are on the same circuit board, and the circuit unit 30 is the routing on the circuit board, but not limited to this.

The descriptions above are only preferred embodiments of the present invention, and do not limit the present invention in any form. Although the present invention is disclosed above with preferred embodiments, they are not used to limit the present invention. Any skilled person familiar with the art can make use of the present invention without departing from the scope of the technical solution of the present invention. The technical contents disclosed above are slightly changed or modified into equivalent embodiments with equivalent changes. However, any simple modifications, equivalent changes and modifications made to the above embodiments based on the technical essence of the present invention are still within the scope of the technical solution of the present invention without departing from the content of the technical solution of the present invention.

What is claimed is:

1. A power-driving circuit for a display panel, comprising:

a timing controller integrated circuit (TCON IC) unit;

a first power management integrated circuit (PMIC) unit, comprising a first input port and multiple first output ports; wherein, the first input port is electrically connected to the TCON IC unit to receive a timing control signal;

a circuit unit, comprising multiple first circuit unit input ports and multiple circuit unit output ports; wherein, the first circuit unit input ports are electrically connected to the first output ports to receive multiple power management signals from the first PMIC unit;

wherein, the first output ports of the first PMIC unit comprise a first output terminal, a second output terminal, a third output terminal, and a fourth output terminal;

wherein, the circuit unit output ports of the circuit unit comprise a first circuit unit output terminal and a second circuit unit output terminal;

wherein, the first circuit unit input ports are electrically connected to the first circuit unit output ports, by electrically connecting in parallel the first output terminal and the second output terminal, and the first circuit unit input ports are electrically connected to the second circuit unit output ports, by electrically connecting in parallel the third output terminal and the fourth output terminal;

wherein, the circuit unit output ports are electrically connected to a display unit and output a parallel driving signal to the display unit.

2. The power-driving circuit as claimed in claim 1, wherein, the first PMIC unit further comprises a first interrupt signal output terminal, and the first interrupt signal output terminal is electrically connected to the TCON IC unit, to output a first interrupt signal to the TCON IC unit.

* * * * *